UNITED STATES PATENT OFFICE.

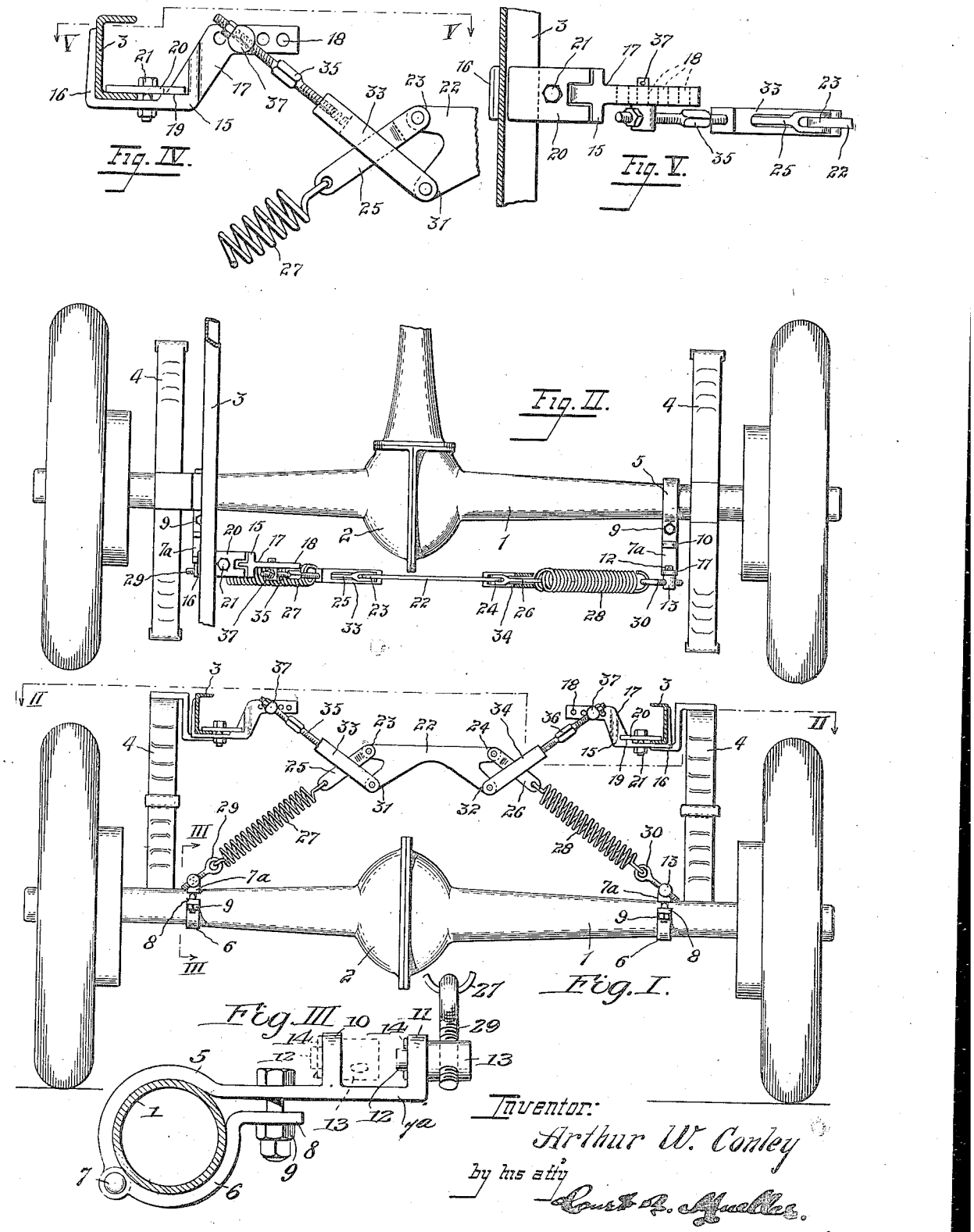

ARTHUR W. CONLEY, OF CLEVELAND, OHIO.

VEHICLE-STABILIZER.

1,203,100.   Specification of Letters Patent.   Patented Oct. 31, 1916.

Application filed November 11, 1915. Serial No. 60,810.

*To all whom it may concern:*

Be it known that I, ARTHUR W. CONLEY, a citizen of the United States, residing at Cleveland, in the county of Cuyahoga and State of Ohio, have invented a new and useful Improvement in Vehicle-Stabilizers, of which the following is a specification, the principle of the invention being herein explained and the best mode in which I have contemplated applying that principle, so as to distinguish it from other inventions.

This invention appertains to vehicle stabilizers and more particularly to mechanism adapted at one and the same time to check rebound, to check tilting of the superstructure laterally and to equalize either of these actions so as to tend to dissipate sudden shock by distribution in certain measure to other locations. I am well aware that this principle in the broad sense has been employed in the brake mechanism of railway cars though to necessarily different purpose, and necessarily so owing to the different nature of the roadway over which travel was to be had.

My object has been the provision of a device of the general character stated which would lend itself to the exigencies of modern day automobile traffic with greatly varying load and character of road bed and besides, be adapted to various makes and sizes of car upon which it may be readily attached when sold as a distinct accessory.

With the foregoing and other objects in view the invention consists of the novel construction, combination and arrangement of parts as hereinafter more specifically described and illustrated in the accompanying drawings, wherein is shown the preferred embodiment of the invention, but it is to be understood that many other changes, variations and modifications can be resorted to which come within the scope of the claims hereunto appended.

Adverting to the drawings: Figure I is a rear elevation of a portion of an automobile structure showing my invention operatively associated therewith. Fig. II is a view taken on line II—II of Fig I looking downwardly. Fig. III is an enlarged view taken on line III—III of Fig. I. Fig. IV is an enlarged detail view of a part of the structure embodying my invention and specifically that part which appears in the upper left hand corner of Fig. I. Fig. V is a plan view taken on line V—V of Fig. IV looking in the direction indicated by the arrows.

Only such of the parts of an automobile as are essential to an understanding of the manner in which my invention may be utilized has been illustrated and will now be identified to comprise a rear axle housing 1, differential gear case 2, opposite sides of the chassis frame 3, and interconnecting pair of springs 4. Inasmuch as my invention is designed to effect an additional and reacting connection between the axle and the frame of a vehicle for the purpose of serving as a rebound check and acting as a stabilizer in opposition to the tendency of the opposite sides of the vehicle to tilt, special means must be provided for attaching alike to the axle housing and to the frame. Accordingly I employ two pairs of clamps, but since each one of a given pair is a duplicate of the other the single number may be employed in describing the structure thereof.

The kind of clamp which I prefer to employ upon the axle housing is most clearly shown in Fig. III. It includes a pair of curved members 5 and 6 which are hinged at 7, the former of which is provided with an elongated extension $7^a$ while the latter carries a shorter extension 8 in opposition to the other whereby a bolt and lock nut combination 9 may be passed therethrough and the members 5 and 6 constricted upon the housing 1. The extension $7^a$ will be seen to include a pair of transverse projections 10 and 11 which are spaced different distances from the housing 1. Each of the projections is provided with an opening in which a pin 12 having an enlarged head 13 may be inserted and held in place as by a cotterpin 14. The head 13 of the pin 12 is fashioned with a screw threaded opening for a purpose to be hereinafter explained. The direction of projection of the extension $7^a$ is rearwardly and for the purpose of supporting certain other parts of my invention beyond so as not to interfere with the differential gear case 2 as may be seen in Fig. II. It is to be understood, however, that if desirable for specific makes of automobiles my inventive structure as a whole may be supported forwardly of the rear axle.

The manner of effecting connection above with the frame of the vehicle may be likewise explained in the singular number and in this connection an inspection is invited of Fig. IV. It will be there seen that an angular bracket 15 includes one extremity 16 of L shaped form to lie against the under and outer surface of the frame 3, whereas the inner extremity 17 extends upwardly and then inwardly to be fashioned with a series of apertures 18. An upper side of the bracket 15 is provided with a flat surface 19 which is elevated to such an extent as will adapt it to lie on a level with an upper surface of the frame 3, and thereby permit a cooperating plate 20 to overlie both surfaces and be clamped thereagainst by a bolt and nut combination 21. The purpose in having several apertures 18 is the common one of permitting an adjustment by connection with one or the other thereof.

What I term an equalizer 22 is clearly seen in Fig. I and is adapted to be connected both with the attachments to the housing and to the brackets upon the frame. To this end the upper lateral ends 23 and 24 articulate with a pair of forked links 25 and 26 and these in turn with a pair of tension springs 27 and 28. These two springs connect with the screw threaded openings in the heads 13 by means of a pair of eye screws as appears in Figs. I and III. The lower lateral ends 31 and 32 of the equalizer articulate with a pair of clevises 33 and 34 which inclose the links 25 and 26 respectively as is more clearly shown in Fig. V. The other ends of the clevises 33 and 34 are adjustably connected with right and left threaded screws 35 and 36 with pins 37 of the same formation as the pins 12 and adapted for insertion into one of the apertures 18. As will now be apparent a reacting connection is established between the frame and the axle housing tending to equalize any sudden relative movement of one toward or away from the other as well as any tilting movement on the part of one or the other or both. The tension of the springs 27 and 28 may be equalized directly by an adjustment of the eye screws in the heads 13, and indirectly by a rotation of the right and left threaded screws 35 and 36.

The operation of my stabilizer may be tersely explained as follows: In the event that one of the springs 4 has been violently flexed such that the rebound of the frame should be controlled, out of consideration for the comfort of a passenger, the tendency to carry the bracket 15 upwardly will draw the equalizer 22 diagonally in its direction. This action is, however, promptly resisted by both of the springs 27 and 28, the former in proportion to the shock which may have been simultaneously incurred by the side of the vehicle where it is located. It should be noted that my stabilizer does not functionate during any depression of the vehicle superstructure toward the axle because it is only movement tending to separate the two either on one side of the vehicle or on both which my invention is designed to overcome though the springs are always in sufficient tension to avoid slack.

I claim:

1. A vehicle stabilizer comprising the combination with a frame and an axle, of an equalizer, reacting means including a part of springs extending obliquely between and loosely connecting opposite sides of said frame and axle with said equalizer, whereby the latter is freely suspended therebetween.

2. A vehicle stabilizer comprising the combination with a frame and an axle, of reacting means, including a plurality of members extending obliquely between and loosely connected to said frame and axle and to each other, and a plurality of distinct means for adjusting the obliquity of incidence of said means and adapted to equalize the stresses therebetween.

3. A vehicle stabilizer comprising the combination with a frame and an axle, two pair of clamps detachably secured to said frame and axle respectively near opposite sides of the vehicle, a plurality of loosely connected members including a pair of obliquely extending springs for connecting said clamps, and means for adjusting the points of connection of two of said members with one pair of said clamps.

4. A vehicle stabilizer comprising the combination with a frame and an axle, a pair of clamps attached to said frame, another pair of clamps secured to said axle, one pair of said clamps being provided with extensions, an equalizer, reacting mechanism connected to the other of said clamps, and means for attaching said mechanism at various points along said extensions.

5. A vehicle stabilizer comprising the combination with a frame and an axle, a pair of clamps attached to said frame and axle respectively, one of said clamps being provided with an aperture, a pin swiveled in said opening, reacting mechanism including an obliquely extending spring connecting said pin with the other clamp, means for adjusting the obliquity of incidence of said spring, and means for adjusting the tension of said spring.

6. A vehicle stabilizer comprising the combination with a frame and an axle, a pair of clamps attached to said frame and axle respectively, one of said clamps being provided with an aperture, a pin swiveled in said opening and itself provided with a screw-threaded opening, and reacting mechanism connecting said pin with the other clamp and including a spring, and a member in threaded connection with said opening whereby to control the tension of said spring.

7. A vehicle stabilizer comprising the combination with a frame and an axle, an equalizer, and reacting mechanism including four members connecting said equalizer with opposite sides of said frame and opposite ends of said axle respectively.

8. A vehicle stabilizer comprising the combination with a frame and an axle, an equalizer, a member connecting said equalizer with one side of the frame, a spring connecting said equalizer near one end of the axle, a second member connecting said equalizer with the other side of the frame, and a second spring connecting said equalizer near the other end of said axle.

9. A vehicle stabilizer comprising the combination with a frame and an axle, an equalizer, a member connecting a lower side edge of said equalizer with one side of the frame, a spring connecting an upper side edge of said equalizer with one end of the axle, a second member connecting a lower edge of the other side of said equalizer with the other side of the frame, and a second spring connecting an upper edge of the other side of said equalizer with the other end of said axle.

10. A vehicle stabilizer comprising the combination with frame and axle parts, an equalizer, a member connecting said equalizer with one of said parts on one side of the vehicle, a spring connecting said equalizer with another of said parts on the same side of the vehicle, a second member connecting said equalizer with a different one of said parts on the other side of the vehicle, and a second spring connecting said equalizer with still another of said parts on the last mentioned side of said vehicle.

11. A vehicle stabilizer comprising the combination with frame part and an axle part, an equalizer, yielding connections joining opposite sides of said equalizer with one of said parts on opposite sides of the common middle respectively, connections joining opposite sides of said equalizer with the other of said parts on opposite sides of the common middle respectively, and means for adjusting one of said connections.

12. A vehicle stabilizer comprising the combination with frame part and an axle part, an equalizer, devices including a pair of springs for connecting opposite sides of said equalizer with one of said parts on opposite sides of the common middle respectively, and adjustable devices similarly connecting opposite sides of said equalizer with the other of said parts, whereby to alter the tension of said springs.

13. A stabilizer comprising in combination with a pair of relatively movable parts, an equalizer, and reacting mechanism joining opposite ends of said equalizer with said parts respectively and on opposite sides of said equalizer.

14. A vehicle stabilizer comprising in combination with a pair of relatively movable parts, an equalizer, reacting mechanism joining opposite ends of said equalizer with said parts respectively and on opposite sides of said equalizer, different parts of said mechanism being so related as to maintain an equilibrium of the whole.

15. Stabilizer comprising in combination with a pair of yieldingly connected parts, and reacting means also connecting said parts, said means including four connections arranged to cross each other in pairs and an equalizer for the purpose specified.

16. A vehicle stabilizer comprising the combination of a frame, an axle, a pair of springs connecting opposite sides of the former near opposite ends of the latter, an equalizer, and reacting mechanism additionally connecting said frame and axle to said equalizer, said mechanism including links and clevises intersected thereby, each link and clevis connecting two corners whereby to simultaneously resist tendencies of said parts to separate and to swing in a sidewise direction.

Signed by me, this 5th day of November, 1915.

ARTHUR W. CONLEY.